3,170,003
PROCESS OF PRODUCING POLYURETHANE PLASTICS AND RESULTING PRODUCTS
Kurt Genski, Cornelius Mühlhausen, and Erwin Müller, all of Leverkusen, and Hans Holtschmidt, Cologne-Stammheim, Germany, assignors to Farbenfabriken Bayer Aktiengesellschaft, Leverkusen, Germany, a corporation of Germany
No Drawing. Filed Sept. 25, 1959, Ser. No. 842,211
Claims priority, application Germany, Oct. 1, 1958, F 26,699
20 Claims. (Cl. 260—858)

This invention relates to polyurethane plastics and a method for making the same and more particularly, to hard highly cross-linked polyurethane plastics, suitable for use as a substitute for hard rubber and steel.

It has been heretofore known to produce polyurethane plastics having a high molecular weight from linear or predominantly linear polyhydroxy compounds such as, for example, polyesters, polyethers, or polythioethers, cross-linking agents containing active hydrogen containing groups for example, glycols, diamines, amino alcohols, and water, and reacting the mixture of these materials in a first step with a deficiency of a polyisocyanate to produce a storable product, which can be further processed on a roller such as is used in the rubber industry with additional polyisocyanate to cause cross-linking and thus produce a highly cross-linked product.

It has also been heretofore proposed to react polyisocyanates with mono-functional compounds having reactive hydrogen atoms such as, for example, phenols in the reaction stated above. Upon heating these materials at the reaction temperature, free polyisocyanates are liberated which takes place either in the first step of the above process or in the cross-linking step.

By the process outlined above, plastics are initially formed, which may be stored for any desirable length of time. These intermediate products may, at any suitable time, be cross-linked by processing on a roller with additional polyisocyanate to produce an elastic plastic.

Natural or synthetic rubbers with a butadiene base have found widespread application because they can be vulcanized with sulfur to form cross-linked elastomeric products. Also, the strength and properties of natural and synthetic rubbers and the hardness of the rubbers can be varied by the incorporation therein of fillers and plasticizers. By incorporating very finely divided fillers therein the strength and other properties are improved to an exceptional degree. Further, these rubber materials can be converted into rigid hard rubber by very strong cross-linking, which is achieved by adding an extremely large amount of sulfur. Between the elastic rubber and the rigid hard rubber, there is an intermediate range, the products of which have an increasing hardness and a decreasing elasticity.

In the preparation of polyurethane plastics by the above-mentioned process whereby cross-linked plastics of a high molecular weight are produced from a storable intermediate product, there are obtained elastomeric materials having a relatively low E-modulus that is, modulus of elasticity. Intensifying effects similar to that used in accordance with the rubber technology can be achieved by the use of known fillers in the polyurethane plastics. However, this effect takes place only when relatively small quantities of fillers, up to about 20 to 30% are incorporated into the plastic. Severe deterioration of the other physical properties of the plastics have resulted when an attempt was made to increase the E-modulus by adding larger quantities of fillers. Heretofore, it has been impossible to produce highly cross-linked plastics having an E-modulus variable in a wide range comparable to that of highly vulcanized rubber, which still retains high rebound elasticity and good physical properties in other respects, from a storage stable intermediate by the addition of polyisocyanates.

It is, therefore, an object of this invention to produce highly cross-linked polyurethane plastics. It is another object to produce highly cross-linked polyurethane plastics having properties comparable to that of strongly vulcanized rubber. It is a further object to produce highly cross-linked polyurethane plastics having an E-modulus higher than that known in the polyurethane industry without decreasing the other physical properties of the material. It is still another object to provide a method of making highly cross-linked polyurethane plastics. It is a still further object to provide a method of making highly cross-linked polyurethane plastics having properties comparable to strongly vulcanized rubber. It is another object of this invention to provide a method of making highly cross-linked polyurethane plastics having a high E-modulus without decreasing the other physical properties of the plastic. It is a supplemental object to produce a highly cross-linked polyurethane plastic and a method for making the same from a storage stable intermediate reaction product of a compound containing active hydrogen containing groups in the molecule and a polyisocyanate.

The foregoing and other objects are accomplished in accordance with this invention by reacting a storage stable intermediate, prepared by reacting an organic compound containing active hydrogen containing groups in the molecule, which groups are reactive with isocyanate groups and having a molecular weight of at least about 1000, an organic compound having at least two active hydrogen containing groups in the molecule, which groups are reactive with isocyanate groups and having a molecular weight of less than about 500 and a deficiency of a diisocyanate, with a polyisocyanate while adding an organic compound containing at least two active hydrogen containing groups in the molecule, which groups are reactive with isocyanate groups and having a molecular weight of less than about 500. The quantity of polyisocyanate added in the second step is in excess of the quantity necessary to react with the sum of the active hydrogen containing groups of the storage stable intermediate product and the organic compound having a molecular weight less than about 500 added in the second step and should be from about 20 to about 200 mol percent of that necessary to react with all the active hydrogen containing groups present. The polyisocyanate and the organic compound having a molecular weight less than about 500 are added to the storage stable intermediate product of the first step while working the intermediate on rollers similar to those used in the rubber industry.

The percentage of the organic compound containing active hydrogen containing groups and having a molecular weight of less than about 500 should be from about 5% to about 80% by weight and preferably between about 10% and about 50%, calculated on the amount of storage stable intermediate.

In accordance with the invention, the organic compound containing active hydrogen containing groups in the molecule, which groups are reactive with isocyanate groups and having a molecular weight of at least about 1000 can be any organic compound such as, for example, hydroxyl polyesters, polyhydric polyalkylene ethers, polyhydric polythioethers, polyester amides, polyacetals, and organic compounds containing activated methylene groups. These compounds should have an hydroxyl number of from about 30 to about 150 and an acid number less than about 4.

Any suitable hydroxyl polyester may be used such as, for example, those produced by the thermal condensation of a polycarboxylic acid and a polyhydric alcohol. Any suitable polycarboxylic acid may be used such as, for example, succinic, oxalic, adipic, methyladipic, sebacic, glutaric, pimelic, azelaic, suberic, and the like; aromatic carboxylic acids including phthalic, terephthalic, isophthalic, 1,2,4-benzene tricarboxylic, and the like; sulphur containing acids such as, for example, thiodiglycolic, thiodipropionic and the like; unsaturated acids such as, for example, maleic, fumaric, itaconic, citraconic, and the like. Any suitable polyhydric alcohol may be used such as, for example, ethylene glycol, diethylene glycol, propylene glycol, 1,3-butylene glycol, 1,6-hexane diol, trimethylol propane, pentaerythritol, glycerine, and the like.

Any suitable polyhydric polyalkylene ether may be used, such as, for example the product obtained by polymerizing alkylene oxides or the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexane diol, hexane triol, and the like. Any suitable alkylene oxide may be used such as, for example, ethylene oxide, propylene oxide, butylene oxide, amylene oxide, and the like. The polyhydric polyalkylene ethers may be prepared by any known process such as, for example, the process described in Wurtz in 1859 and in "Encyclopedia of Chemical Technology," volume 7, pages 257 to 262 published by Interscience Publishers Inc. (1951) or in U.S. Patent 1,922,459.

Any suitable polyhydric polythioether may be used such as, for example, the reaction product of one of the aforementioned alkylene oxides used in the preparation of polyhydric polyalkylene ethers with a thioether glycol such as, for example, thiodiglycol, 3,3'-dihydroxypropyl sulfide, 4,4'-dihydroxybutyl sulfide, 1,4-(beta hydroxy ethyl) phenylene diethioether and the like.

Any suitable polyester amide may be used such as, for example, the reaction product of an amine and/or amino alcohol with a carboxylic acid. Any suitable amine such as, for example, ethylene diamine, propylene diamine, and the like may be used. Any suitable amino alcohol, such as, for example 1-hydroxy, 2-amino ethylene, and the like may be used. Any suitable polycarboxylic acid may be used such as, for example, those more particularly disclosed above for the preparation of hydroxy polyesters.

Any suitable polyacetal may be used such as, for example, the reaction product of an aldehyde and a polyhydric alcohol. Any suitable aldehyde may be used such as, for example, formaldehyde, paraldehyde, butyraldehyde, and the like. Any of the polyhydric alcohols mentioned above in the preparation of the hydroxyl polyesters may be used.

Any suitable organic compound containing activated methylene groups may be used such as, for example, compounds containing enolizable hydrogen atoms, such as, for example aceto acetic ester, diethyl malonate, methyl-m-butyl malonate, acetyl acetone, acetonyl acetone, and the like.

The only requirement necessary for the compounds containing active hydrogen containing groups, which groups are reactive with isocyanate groups is that the compound has a mean molecular weight of from about 1000 to about 5000 and preferably from about 1500 to about 2500.

In accordance with the invention, any organic compound containing at least two active hydrogen containing groups, which are reactive with isocyanate groups and having a molecular weight of less than about 500 may be used in the first step of the procedure in the preparation of the storage stable intermediate. Examples of such compounds included such as, for example, glycols containing urea groups such as, for example, the reaction product of 1 mol of urea with 2 mols of ethylene oxide, the reaction product of 1 mol oxazolidone with 1 mol of ethanol amine, the reaction product of 1 mol of diethanol amine with 1 mol of potassium cyanate, glycols containing urethane linkages such as, for example, the reaction product of one of the aforementioned compounds containing active hydrogen containing groups, which groups are reactive with isocyanate groups with a deficiency of a polyisocyanate, glycols containing carbonamide groups such as, for example, the reesterification product of 1 mol of the ethanol-bis-ester of adipic acid with 2 mols of ethanol amine, glycols containing ester groups such as, for example, the reaction product of a polycarboxylic acid with an excess of a polyhydric alcohol and compounds containing tertiary nitrogen atoms such as, for example, triethanol amine, tripropanol amine, and the like. Other compounds suitable for use as the organic compound containing active hydrogen containing groups, which groups are reactive with isocyanate groups and which has a molecular weight less than about 500 include water, simple glycols, such as, for example ethylene glycol, propylene glycol, butylene glycol, amylene glycol, trimethylol propane, glycerine, pentaerythritol, hexane triol, and the like; glycols having aromatic ring systems such as, for example, 1,5-naphthalene-beta-dihydroxyethyl ether, hydroquinone-beta-dihydroxyethyl ether, and the like; diamines such as, for example, o-dichlorobenzidine, 2,5-dichloro-p-phenylene diamine, 3,3'-dichloro-4,4'-diaminodiphenylmethane, hydrazine; amino alcohols such as, for example, ethanolamine, diethanolamine, triethanolamine, and the like; amino carboxylic acids such as, for example, beta-aminopropionic acid, piperidic acid, glycine, m-aminobenzoic acid, aminobenzoic acid, aminosuccinic acid, anthranilic acid and the like; and hydroxy carboxylic acids such as, for example beta-hydroxypropionic acid, alpha and beta hydroxy butyric acids, m-hydroxy benzoic acid, p-hydroxybenzoic acid, salicylic acid and the like.

Any suitable diisocyanate may be used in the preparation of the storage stable intermediate product such as, for example, 4,4'-diphenylmethane diisocyanate, the substitution products of 4,4'-diphenylmethane diisocyanate such as, for example, diphenyldimethylmethane-4,4'-diisocyanate, 2,4-tolylene diisocyanate, 2,6-tolylene diisocyanate, m-phenylene diisocyanate, p-phenylene diisocyanate, 1,4-naphthylene diisocyanate, 1,5-naphthylene diisocyanate, diphenyl-4,4'-diisocyanate, azo-benzene-4,4'-diisocyanate, diphenyl sulfone-4,4'-diisocyanate, dicyclohexane - 4,4'-diisocyanate, tetramethylene diisocyanate, hexamethylene diisocyanate and the like. It is to be understood that any suitable diisocyanate may be used including diisocyanates containing substituted urea groups such as, for example, the reaction product of 2 mols of 2,4-tolylene diisocyanate with 1 mol of water.

The storage stable intermediate reaction product is prepared by reacting an organic compound containing active hydrogen containing groups, which groups are reactive with isocyanate groups and having a molecular weight of at least about 1000, an organic compound containing at least two active hydrogen containing groups, which groups are reactive with isocyanate groups and having a molecular weight of less than about 500 with a deficiency of a diisocyanate. The storage stable intermediate may be prepared, for example, by reacting the organic compound having a molecular weight of at least about 1000 with a quantity of a diisocyanate less than that calculated to react with the active hydrogen groups of the compound having a molecular weight of at least about 1000, admixing the reaction product of the diisocyanate and the organic compound having a molecular weight of about 1000 with the organic compound having a molecular weight of less than about 500 and completing the reaction with an additional amount of diisocyanate. The reaction to prepare the storage stable intermediate product may also be carried out by reacting an excess of a suitable diisocyanate with the organic compound having a molecular weight of at least about 1000 and subsequently admixing therewith a quantity of the compound having a molecular weight of less than about 500, which quantity is at least sufficient to react with all of the isocyanate groups present. The storage stable intermediate product can also be prepared by mixing the organic compound having a molecular weight of at least about 1000 and the organic compound having a molecular weight less than about 500 with a deficiency of a suitable diisocyanate.

According to the invention, the storage stable intermediate prepared in accordance with the procedure set forth above is worked on a suitable apparatus such as, for example, a mixing roller or a kneader while about 5% to about 80% by weight of an organic compound containing active hydrogen containing groups, which groups are reactive with isocyanate groups and having a molecular weight below 500 and a quantity of polyisocyanate in excess of the quantity necessary to react with all of the active hydrogen containing groups present in both the storage stable intermediate and the organic compound having a molecular weight of less than 500 are added thereto. The resulting composition can then be pressed into any desired shape.

Any suitable polyisocyanate may be used in the second step of the reaction set forth in the immediately proceeding paragraph to cause the cross-linking of the storage stable intermediate such as, for example, 4,4'-diphenylmethane diisocyanate, the substitution products of 4,4'-diphenylmethane diisocyanate such as, diphenyldimethylmethane-4,4'-diisocyanate, 2,4-tolylene diisocyanate, 2,6-tolylene diisocyanate, mixtures of 2,4 and 2,6-tolylene diisocyanate, p-phenylene diisocyanate, m-phenylene diisocyanate, 1,4-naphthylene diisocyanate, 1,5-naphthylene diisocyanate, diphenyl-4,4'-diisocyanate, azo-benzene-4,4'-diisocyanate, diphenyl sulfone-4,4'-diisocyanate, dicyclohexane-4,4'-diisocyanate, tetramethylene diisocyanate, hexamethylene diisocyanate, and urea diisocyanate which is prepared by reacting 2 mols of 2,4-tolylene diisocyanate with 1 mol of water. Other suitable polyisocyanates include urethdione diisocyanates which are prepared in a known manner by dimerising aromatic diisocyanates such as, for example, 2,4-tolylene diisocyanate, or 1-chloro-2,4-phenylene diisocyanate; triisocyanates such as, for example, triphenylmethane-4,4',4''-triisocyanate, the reaction product of 1 mol of trimethylol propane with 3 mols of tolylene diisocyanate and the like.

Any suitable organic compound containing active hydrogen containing groups, which groups are reactive with isocyanate groups and having a molecular weight less than about 500 may be used such as, for example, those glycols and amines set forth above for the organic compound having a molecular weight less than 500 used in the preparation of the storage stable intermediate.

By the process of this invention plastic products having combinations of properties heretofore unknown are obtained. These plastic products have a high E-modulus, a high degree of hardness, a considerable rebound elasticity and a relatively high breaking elongation. The products of this invention find utility as construction elements in the manufacture of machines and particularly for damping vibrations and for transmitting power. These materials may also be used as substitutes for highly vulcanized natural rubber and synthetic rubber and in some cases as substitutes for steel. A particularly suitable use for the plastic compositions of this invention is in the handles of pneumatic drilling equipment, bearing boxes, gear wheels, buffers, or couplings.

The invention is further illustrated but not limited by the following examples, in which parts and percentage are by weight unless otherwise specified.

EXAMPLE 1-A

*Production of a comparison product*

About 100 parts of an adipic acid-glycol-polyester having an OH number of about 56 are dehydrated for about 1 hour in a vacuum of about 50 mm. at about 120° C. About 12.8 parts of p-phenylene diisocyanate are then added. After a reaction period of about 10 minutes at about 120° C. about 3.5 parts of 1,4-butanediol are mixed therewith and the reaction product is heated for about 15 minutes at about 110° C.

A storage stable intermediate results having properties similar to crude rubber and has a Defo hardness of about 1900. The storage stable intermediate can be cross-linked by known procedures to form an elastomeric product by incorporating therein on a rolling mill about 6 parts of dimeric tolylene diisocyanate to each 100 parts of the storage stable intermediate, with subsequent pressing at about 120° C. for about 30 minutes. This final product has the following properties:

Thickness of the test sheet _____ 6 mm.
Tearing strength _____ 280 kg./cm.$^2$.
Breaking elongation _____ 730%.
Permanent elongation _____ 12%.
Shore A hardness _____ 70°.
Rebound elasticity _____ 52%.
Loading at 20% elongation _____ 9 kg./cm.$^2$.
Loading at 300% elongation _____ 37 kg./cm.$^2$.
Maximum swelling in methylene chloride _ 400%.

EXAMPLE 1-B

In accordance with this invention the storage stable intermediate prepared by the procedure set forth in Example 1-A has incorporated therein on a rolling mill about 10 parts of p-phenylene-beta-dihydroxyethyl ether and about 18 parts by weight of dimeric tolylene diisocyanate for each 100 parts of the storage stable intermediate. The product is then pressed for at least about 30 minutes at about 130° C. The resulting product has the following properties:

Thickness of the test sheet _____ 6 mm.
Tensile strength _____ 237 kg./cm.$^2$.
Breaking elongation _____ 510%.
Permanent elongation _____ 19%.
Shore A hardness _____ 92°.
Rebound elasticity _____ 42%.
Loading at 20% elongation _____ 73 kg./cm.$^2$.
Loading at 300% elongation _____ 155 kg./cm.$^2$.

EXAMPLE 1-C

In accordance with this invention the storage stable intermediate prepared by the procedure set forth in Example 1-A has incorporated therein on a rolling mill about 20 parts of p-phenylene-beta-dihydroxyethyl ether and about 30 parts by weight of dimeric tolylene diisocyanate for each 100 parts of the storage stable intermediate. The product is then pressed for at least about 30 minutes at about 130° C. The resulting product has the following properties:

Thickness of the test sheet _____ 6.1 mm.
Tensile strength _____ 249 kg./cm.$^2$.
Breaking elongation _____ 345%.
Permanent elongation _____ 21%.
Shore A hardness _____ 96°.
Rebound elasticity _____ 39%.
Loading at 20% elongation _____ 172 kg./cm.$^2$.
Loading at 300% elongation _____ 181 kg./cm.$^2$.

EXAMPLE 1-D

In accordance with this invention the storage stable intermediate prepared by the procedure set forth in Example 1-A has incorporated therein on a rolling mill about 30 parts of p-phenylene-beta-dihydroxyethyl ether and about 42 parts by weight of dimeric tolylene diisocyanate for each 100 parts of the storage stable intermediate. The product is then pressed for at least about 30 minutes at about 130° C. The resulting product has the following properties:

Thickness of the test sheet _____ 2 mm.
Tensile strength _____ 250 kg./cm.$^2$.
Limit bending stress _____ 247 kg./cm.$^2$.
Impact toughness (Dynstat) _____ 95%, unbroken.
Notch-impact toughness (Dynstat) ____ 100%, unbroken.
Maximum stress at commencement
 of flow _____ 230 kg./cm.$^2$.

Brinell hardness after 10 seconds _____ 348.
Brinell hardness after 60 seconds _____ 343.
Maximum swelling in methylene
  chloride _____ 90%.

EXAMPLE 2-A

*Production of a comparison product*

To about 100 parts of a polythioether prepared by reacting 2 mols of thiodiglycol with 1 mol of triethylene glycol and having an hydroxyl number of about 67.5 and an acid number of about 0.3 is admixed about 0.9 part of water. About 12.5 parts of tolylene diisocyanate are then added and the reaction mass is heated for about 15 hours at about 90° C. The rubber-like storage stable intermediate reaction product formed, which has a Defo hardness of about 900 is then admixed on a roller mill with about 10 parts of 4,4'-diisocyanato-3,3'-dimethyl-diphenyl urea to each 100 parts of the intermediate. A test sheet pressed at least for about 30 minutes at about 130° C. has the following mechanical properties:

Thickness of the test sheet _____ 6 mm.
Tensile strength _____ 150 kg./cm.²
Breaking elongation _____ 390%.
Permanent elongation _____ 3%.
Shore A hardness _____ 69°.
Rebound elasticity _____ 58%.
Loading at 20% elongation _____ 16 kg./cm.²
Loading at 300% elongation _____ 56 kg./cm.²
Maximum swelling in methylene chloride _ 320%.

EXAMPLE 2-B

In accordance with this invention the polythioether storage stable intermediate prepared in Example 2-A has incorporated therein on a roller mill about 11.5 parts of p-phenylene dihydroxyethyl ether and about 45 parts of 4,4'-diisocyanate-3,3'-dimethyldiphenyl urea to about each 100 parts of the storage stable intermediate. The final product is pressed for at least about 30 minutes at about 130° C. The resulting product is a rigid plastic having the following properties:

Thickness of the test sheet _____ 2 mm.
Tensile strength _____ 310 kg./cm.²
Limit bending stress _____ 205 kg./cm.²
Impact toughness _____ 100%, unbroken.
Notch impact toughness _____ 100%, unbroken.
Maximum stress at commencement
  of flow _____ 195 kg./cm.²
Brinell hardness:
  (a) After 10 seconds _____ 246.
  (b) After 60 seconds _____ 241.
Maximum swelling in methylene
  chloride _____ 36%.

EXAMPLE 3-A

*Production of a comparison product*

To about 100 parts of an adipic-diethylene-glycol polyester having an hydroxyl number of about 60 and an acid number of about 1 are admixed about 0.9 part of water and about 4.4 parts of 1,4-butene diol. Thereafter about 19.8 parts of tolylene diisocyanate are added and the reaction product is heated for about 15 hours at about 90° C. The resulting crude rubber-like storage stable intermediate reaction product, which has a Defo hardness of about 1200 is admixed on a roller mill with about 8 parts of 4,4'-diphenylmethane-diisocyanate for about each 100 parts of the storage stable intermediate. The resulting product is pressed for at least about 30 minutes at about 125° C. The material has the following properties:

Thickness of the test sheet _____ 5.9 mm.
Tearing strength _____ 220 kg./cm.²
Breaking elongation _____ 790%.
Permanent elongation _____ 11%.
Shore A hardness _____ 62°.
Rebound elasticity _____ 41%.
Loading at 20% elongation _____ 4 kg./cm.²
Loading at 300% elongation _____ 29 kg./cm.²
Maximum swelling in methylene chloride _ 460%.

EXAMPLE 3-B

In accordance with this invention, the storage stable crude rubber-like intermediate has incorporated therein on a roller mill about 14.5 parts of o,o'-dichlorobenzidine and about 30 parts of 4,4'-diphenylmethane-diisocyanate for each 100 parts of the storage stable intermediate. The product obtained is pressed at about 130° for about 60 minutes. The material has the following properties:

Thickness of the test plate _____ 2 mm.
Tensile strength _____ 280 kg./cm.²
Limit bending stress _____ 233 kg./cm.²
Impact toughness _____ 100%, unbroken.
Notch impact toughness _____ 94%, unbroken.
Maximum stress at commencement of
  flow _____ 214 kg./cm.²
Brinell hardness:
  (a) After 10 seconds _____ 279.
  (b) After 60 seconds _____ 274.
Maximum swelling in methylene chloride _____ 96%.

EXAMPLE 4-A

*Production of a comparison product*

To about 100 parts of an adipic acid-glycol-polyester having an hydroxyl number of about 56 and an acid number of about 0.8, which has been previously dehydrated at about 120° C. and 50 mm. for about 1 hour, are added with stirring about 10.8 parts of tolylene diisocyanate. After a reaction period of about 10 minutes at about 120° C., about 5.6 parts of o,o'-dichlorobenzidine are admixed therewith and the reaction product is heated for about 5 hours at about 110° C. The crude rubber-like storage stable intermediate reaction product having a Defo hardness of about 2300 is admixed on a roller mill with about 8 parts of dimeric tolylene diisocyanate for each 100 parts of the storage stable intermediate. A test sheet pressed for about 20 minutes at about 110° C. has the following properties:

Thickness of the test sheet _____ 6 mm.
Tearing strength _____ 389 kg./cm.²
Breaking elongation _____ 754%.
Permanent elongation _____ 14%.
Shore A hardness _____ 79°.
Rebound elasticity _____ 48%.
Load at 20% elongation _____ 21 kg./cm.²
Load at 300% elongation _____ 81 kg./cm.²
Maximum swelling in methylene chloride _ 364%.

EXAMPLE 4-B

In accordance with this invention about 28 parts of 1,5-naphthalene dihydroxyethyl ether and about 35 parts of dimeric tolylene diisocyanate for each 100 parts of the storage stable intermediate are incorporated into the storage stable intermediate crude rubber-like reaction product of Example 4-A on a roller mill. A rigid plastic material is obtained having the following physical properties:

Thickness of the test sheet _____ 2 mm.
Tensile strength _____ 418 kg./cm.²
Limit bending stress _____ 402 kg./cm.²
Maximum stress at commencement of
  flow _____ 396 kg./cm.²
Brinell hardness:
  (a) After 10 seconds _____ 496.
  (b) After 60 seconds _____ 492.
Maximum swelling in methylene chloride _ 76%.

EXAMPLE 5-A

*Production of a comparison product*

To about 100 parts by weight of a polyalkylene ether prepared by polymerizing tetrahydrofuran and having an hydroxyl number of about 46 are admixed about 0.9 part of water and 0.7 part of butenediol. Thereafter about 11 parts of tolylene diisocyanate are added and the reaction mass is heated for about 15 hours at about 90° C. to obtain a rubber-like storage stable intermediate having a Defo hardness of about 2000. About 8 parts of p-phenylene diisocyanate are admixed therewith on a roller mill for each 100 parts of the storage stable intermediate. A test sheet pressed for about 30 minutes at about 130° C. has the following mechanical properties:

Thickness of the test sheet _____ 6 mm.
Tearing strength _____ 220 kg./cm.$^2$.
Breaking elongation _____ 460%.
Permanent elongation _____ 5%.
Shore A hardness _____ 60°.
Rebound elasticity _____ 62%.
Load at 20% elongation _____ 18 kg./cm.$^2$.
Load at 300% elongation _____ 62 kg./cm.$^2$.
Maximum swelling in methylene chloride _ 460%.

EXAMPLE 5-B

In accordance with this invention about 11.5 parts of p-phenylene dihydroxyethyl ether and about 25 parts of p-phenylene diisocyanate for each 100 parts of the storage stable intermediate are incorporated into the storage stable intermediate of Example 5-A on a roller mill. A test sheet pressed for about 30 minutes at about 130° C. results in a rigid plastic having the following properties:

Thickness of the test sheet _____ 2 mm.
Tensile strength _____ 360 kg./cm.$^2$.
Limit bending stress _____ 215 kg./cm.$^2$.
Impact toughness _____ 100%, unbroken.
Notch impact toughness _____ 100%, unbroken.
Maximum stress at commencement of
 flow _____ 310 kg./cm.$^2$.
Brinell hardness:
 (a) After 10 seconds _____ 310.
 (b) After 60 seconds _____ 305.
Maximum swelling in methylene chloride _____ 120%.

EXAMPLE 6-A

*Production of a comparison product*

To about 100 parts of an adipic acid-glycol-polyester having an OH number of about 56 which has previously been dehydrated for about 1 hour at about 120° C. and about 50 mm. are added about 20 parts of 4,4'-diphenylmethane diisocyanate. After a reaction time of about 10 minutes at about 120° C. about 7.7 parts of p-phenylene dihydroxyethyl ether are added and the reaction product is heated for about 15 hours at about 110° C. A crude rubber-like storage stable intermediate product is formed having a Defo hardness of 2200. This product is subsequently reacted with about 6 parts of dimeric tolylene diisocyanate for each 100 parts of the storage stable intermediate on a roller mill. A test sheet pressed at about 130° C. for about 30 minutes has the following properties:

Thickness of the test sheet _____ 6 mm.
Tearing strength _____ 270 kg./cm.$^2$.
Breaking elongation _____ 620%.
Permanent elongation _____ 18%.
Shore A hardness _____ 82°.
Rebound elasticity _____ 45%.
Load at 20% elongation _____ 21 kg./cm.$^2$.
Load at 300% elongation _____ 74 kg./cm.$^2$.
Maximum swelling in methylene chloride _____ 380%.

EXAMPLE 6-B

In accordance with this invention about 10 parts of 1,4-butanediol and about 35 parts of dimeric tolylene diisocyanate per 100 parts of the storage stable intermediate of Example 6-A are incorporated into the storage stable intermediate on a roller mill. A test sheet pressed for about 30 minutes at about 130° C. has the following properties:

Thickness of the test sheet _____ 2 mm.
Tensile strength _____ 290 kg./cm.$^2$.
Limit bending stress _____ 185 kg./cm.$^2$.
Impact toughness _____ 100%, unbroken.
Notch impact toughness _____ 100%, unbroken.
Maximum stress at commencement of
 flow _____ 190 kg./cm.$^2$.
Brinell hardness:
 (a) After 10 seconds _____ 238.
 (b) After 60 seconds _____ 233.
Maximum swelling in methylene chloride _____ 95%.

EXAMPLE 6-C

In accordance with this invention the storage stable intermediate of Example 6-A has incorporated therein on a roller mill about 30 parts of 3,3'-dichloro-4,4'-diaminodiphenylmethane and about 35 parts of dimeric tolylene diisocyanate per 100 parts of the storage stable intermediate. A test sheet pressed for about 30 minutes at about 130° C. has the following properties:

Thickness of the test sheet _____ 6 mm.
Tensile strength _____ 340 kg./cm.$^2$.
Limit stress _____ 315 kg./cm.$^2$.
Impact toughness _____ 100%, unbroken.
Notch impact toughness _____ 96%, unbroken.
Maximum stress at commencement of
 flow _____ 310 kg./cm.$^2$.
Brinell hardness:
 (a) After 10 seconds _____ 364.
 (b) After 60 seconds _____ 361.
Maximum swelling in methylene chloride _____ 85%.

In some cases the products produced according to the present process are of such a high hardness that it was impossible to subject the products to the same tests as the comparison product. It was necessary to run different tests for the hard products.

Although the invention has been described in considerable detail in the foregoing, in order to properly illustrate the invention, it is to be understood that the purpose of such detail is solely to illustrate the embodiments of the invention and that modifications can be made by those skilled in the art without departing from the spirit and scope of the invention as set forth in the claims.

What is claimed is:

1. The process of producing polyurethane plastics which comprises preparing a storage stable intermediate in a first step by reacting a first organic compound containing active hydrogen containing groups in the molecule, said groups being reactive with isocyanate groups, said first compound having a molecular weight of at least about 1000, a second organic compound containing active hydrogen containing groups in the molecule, said groups being reactive with isocyanate groups, said second compound having a molecular weight of less than about 500 with a deficiency of an organic diisocyanate and curing said storage stable intermediate in a second step by admixing therewith an organic compound containing active hydrogen containing groups in the molecule, said groups being reactive with isocyanate groups, said compound having a molecular weight of less than about 500, and an organic polyisocyanate in excess of the amount necessary to react with all the active hydrogen containing groups of the storage stable intermediate and the organic compound containing active hydrogen containing groups added in said second step.

2. The process of claim 1 wherein the organic compound containing active hydrogen containing groups in the molecule, and having a molecular weight less than about 500 is an organic compound containing aliphatically-bound active hydrogen containing groups selected from the group consisting of amino and hydroxyl groups.

3. The process of producing polyurethane plastics which comprises preparing a storage stable intermediate in a first step by reacting a first organic compound containing active hydrogen containing groups in the molecule, said groups being reactive with isocyanate groups, said first compound having a molecular weight of at least about 1000, having an hydroxyl number of from about 30 to about 150, a second organic compound containing active hydrogen containing groups in the molecule, said groups being reactive with isocyanate groups, said second compound having a molecular weight less than about 500 with a deficiency of an organic diisocyanate, admixing with said storage stable intermediate an organic compound containing active hydrogen containing groups in the molecule, said groups being reactive with isocyanate groups, said compound having a molecular weight less than about 500 and an excess of an organic polyisocyanate, said excess being at least sufficient to react with all the active hydrogen containing groups present in the storage stable intermediate and the organic compound having a molecular weight less than 500.

4. In the process for preparing polyurethane plastics from a storage stable intermediate prepared by reacting a first organic compound containing active hydrogen containing groups in the molecule, said groups being reactive with isocyanate groups, said first compound having a molecular weight of at least about 1000, a second organic compound containing active hydrogen containing groups in the molecule, said groups being reactive with isocyanate groups, said second compound having a molecular weight of less than about 500 with a deficiency of an organic diisocyanate the improvement which comprises curing said intermediate by admixing therewith an organic compound containing active hydrogen containing groups in the molecule, said groups being reactive with isocyanate groups, said compound having a molecular weight of less than about 500 and a quantity of an organic polyisocyanate at least sufficient to react with the active hydrogen containing groups of said storage stable intermediate and said organic compound having a molecular weight less than about 500.

5. A polyurethane plastic product prepared by the process which comprises preparing a storage stable intermediate in a first step by reacting a first organic compound containing active hydrogen containing groups in the molecule, said groups being reactive with isocyanate groups, said first compound having a molecular weight of at least about 1000, a second organic compound containing active hydrogen containing groups in the molecule, said groups being reactive with isocyanate groups, said second compound having a molecular weight of less than about 500 with a deficiency of an organic diisocyanate and curing said storage stable intermediate in a second step by admixing therewith an organic compound containing active hydrogen containing groups in the molecule, said groups being reactive with isocyanate groups, said compound having a molecular weight of less than about 500, and an organic polyisocyanate in excess of the amount necessary to react with all the active hydrogen containing groups of the storage stable intermediate and the organic compound containing active hydrogen containing groups added in said second step.

6. The process of producing polyurethane plastics which comprises preparing a storage stable intermediate in a first step by reacting a first organic compound containing active hydrogen containing groups in the molecule, said groups being reactive with isocyanate groups, said first compound having a molecular weight of at least about 1000, a second organic compound containing active hydrogen containing groups in the molecule, said groups being reactive with isocyanate groups, said second compound having a molecular weight of less than about 500 with a deficiency of an organic diisocyanate and curing said storage stable intermediate in a second step by admixing therewith from about 5% to about 80% by weight of an organic compound containing active hydrogen containing groups in the molecule, said groups being reactive with isocyanate groups, said compound having a molecular weight of less than about 500, and an organic polyisocyanate in excess of the amount necessary to react with all the active hydrogen containing groups of the storage stable intermediate and the organic compound containing active hydrogen containing groups added in said second step.

7. The process of producing polyurethane plastics which comprises preparing a storage stable intermediate in a first step by reacting a first organic compound containing active hydrogen containing groups in the molecule, said groups being reactive with isocyanate groups, said first compound having a molecular weight of at least about 1000 and selected from the group consisting of hydroxyl polyesters prepared by the process which comprises reacting a polycarboxylic acid with a polyhydric alcohol, polyhydric polyalkylene ethers, polyhydric polythioethers, polyesteramides, polyacetals and organic compounds containing activated methylene groups, a second organic compound containing active hydrogen containing groups in the molecule, said groups being reactive with isocyanate groups, said second compound having a molecular weight of less than about 500 and selected from the group consisting of diamines, polyhydric alcohols, amino alcohols, amino carboxylic acids and hydroxy carboxylic acids with a deficiency of an organic diisocyanate and curing said storage stable intermediate in a second step by admixing therewith an organic compound containing active hydrogen containing groups in the molecule, said groups being reactive with isocyanate groups, said compound having a molecular weight of less than about 500 and selected from the group consisting of diamines, polyhydric alcohols, amino alcohols, amino carboxylic acids and hydroxy carboxylic acids and an organic polyisocyanate in excess of the amount necessary to react with all the active hydrogen containing groups of the storage stable intermediate and the organic compound containing active hydrogen containing groups added in said second step.

8. The process of producing polyurethane plastics which comprises preparing a storage stable intermediate in a first step by reacting a first organic compound containing active hydrogen containing groups in the molecule, said groups being reactive with isocyanate groups, said first compound having a molecular weight of at least about 1000 and an hydroxyl number of from about 30 to about 150 and selected from the group consisting of hydroxyl polyesters prepared by the process which comprises reacting a polycarboxylic acid with a polyhydric alcohol, polyhydric polyalkylene ethers, polyhydric polythioethers, polyesteramides, polyacetals and organic compounds containing activated methylene groups, a second organic compound containing active hydrogen containing groups in the molecule, said groups being reactive with isocyanate groups, said second compound having a molecular weight less than about 500 and selected from the group consisting of diamines, polyhydric alcohols, amino alcohols, amino carboxylic acids and hydroxy carboxylic acids with a deficiency of an organic diisocyanate, admixing with said storage stable intermediate an organic compound containing active hydrogen containing groups in the molecule, said groups being reactive with isocyanate groups, said compound having a molecular weight less than about 500 and selected from the group consisting of diamines, polyhydric alcohols, amino alcohols, amino carboxylic acids and hydroxy carboxylic acids and an excess of an organic polyisocyanate, said excess being at least sufficient to react with all the active hydrogen containing groups present in the storage stable intermediate and the organic compound having a molecular weight less than 500.

9. In the process for preparing polyurethane plastics from a storage stable intermediate prepared by reacting a first organic compound containing active hydrogen containing groups in the molecule, said groups being reactive with isocyanate groups, said first compound having a molecular weight of at least about 1000 and selected from the group consisting of hydroxyl polyesters prepared by the process which comprises reacting a polycarboxylic acid with a polyhydric alcohol, polyhydric polyalkylene ethers, polyhydric polythioethers, polyesteramides, polyacetals and organic compounds containing activated methylene groups, a second organic compound containing active hydrogen containing groups in the molecule, said groups being reactive with isocyanate groups, said second compound having a molecular weight of less than about 500 and selected from the group consisting of diamines, polyhydric alcohols, amino alcohols, amino carboxylic acids and hydroxy carboxylic acids with a deficiency of an organic diisocyanate, the improvement which comprises curing said intermediate by admixing therewith an organic compound containing active hydrogen containing groups in the molecule, said groups being reactive with isocyanate groups, said compound having a molecular weight of less than about 500 and selected from the group consisting of diamines, polyhydric alcohols, amino alcohols, amino carboxylic acids and hydroxy carboxylic acids and a quantity of an organic polyisocyanate at least sufficient to react with the active hydrogen containing groups of said storage stable intermediate and said organic compound having a molecular weight less than about 500.

10. A polyurethane plastic product prepared by the process which comprises preparing a storage stable intermediate in a first step by reacting a first organic compound containing active hydrogen containing groups in the molecule, said groups being reactive with isocyanate groups, said first compound having a molecular weight of at least about 1000 and selected from the group consisting of hydroxyl polyesters prepared by the process which comprises reacting a polycarboxylic acid with a polyhydric alcohol, polyhydric polyalkylene ethers, polyhydric polythioethers, polyesteramides, polyacetals and organic compounds containing activated methylene groups, a second organic compound containing active hydrogen containing groups in the molecule, said groups being reactive with isocyanate groups, said second compound having a molecular weight of less than about 500 and selected from the group consisting of diamines, polyhydric alcohols, amino alcohols, amino carboxylic acids and hydroxy carboxylic acids with a deficiency of an organic diisocyanate and curing said storage stable intermediate in a second step by admixing therewith an organic compound containing active hydrogen containing groups in the molecule, said groups being reactive with isocyanate groups, said compound having a molecular weight of less than about 500 and selected from the group consisting of diamines, polyhydric alcohols, amino alcohols, amino carboxylic acids and hydroxy carboxylic acids and an organic polyisocyanate in excess of the amount necessary to react with all the active hydrogen containing groups of the storage stable intermediate and the organic compound containing active hydrogen containing groups added in said second step.

11. The process of producing polyurethane plastics which comprises preparing a storage stable intermediate in a first step by reacting a first organic compound containing active hydrogen containing groups in the molecule, said groups being reactive with isocyanate groups, said first compound having a molecular weight of at least about 1000 and selected from the group consisting of hydroxyl polyesters prepared by the process which comprises reacting a polycarboxylic acid with a polyhydric alcohol, polyhydric polyalkylene ethers, polyhydric polythioethers, polyesteramides, polyacetals and organic compounds containing activated methylene groups, a second organic compound containing active hydrogen containing groups in the molecule, said groups being reactive with isocyanate groups, said second compound having a molecular weight of less than about 500 and selected from the group consisting of diamines, polyhydric alcohols, amino alcohols, amino carboxylic acids and hydroxy carboxylic acids with a deficiency of an organic diisocyanate and curing said storage stable intermediate in a second step by admixing therewith from about 5% to about 80% by weight of an organic compound containing active hydrogen containing groups in the molecule, said groups being reactive with isocyanate groups, said compound having a molecular weight of less than about 500 and selected from the group consisting of diamines, polyhydric alcohols, amino alcohols, amino carboxylic acids and hydroxy carboxylic acids and an organic polyisocyanate in excess of the amount necessary to react with all the active hydrogen containing groups of the storage stable intermediate and the organic compound containing active hydrogen containing groups added in said second step.

12. The process of producing polyurethane plastics which comprises preparing a storage stable intermediate in a first step by reacting a first organic compound containing active hydrogen containing groups in the molecule, said groups being reactive with isocyanate groups, said first compound having a molecular weight of at least about 1000 and selected from the group consisting of hydroxyl polyesters prepared by the process which comprises reacting a polycarboxylic acid with a polyhydric alcohol, polyhydric polyalkylene ethers, polyhydric polythioethers, polyesteramides, polyacetals and organic compounds containing activated methylene groups, a second organic compound containing active hydrogen containing groups in the molecule, said groups being reactive with isocyanate groups,, said second compound having a molecular weight of less than about 500 and selected from the group consisting of diamines, polyhydric alcohols, amino alcohols, amino carboxylic acids and hydroxy carboxylic acids with a deficiency of an organic diisocyanate and curing said storage stable intermediate in a second step by admixing therewith from about 10% to about 50% by weight of an organic compound containing active hydrogen containing groups in the molecule, said groups being reactive with isocyanate groups, said compound having a molecular weight of less than about 500 and selected from the group consisting of diamines, polyhydric alcohols, amino alcohols, amino carboxylic acids and hydroxy carboxylic acids and an organic polyisocyanate in excess of the amount necessary to react with all the active hydrogen containing groups of the storage stable intermediate and the organic compound containing active hydrogen containing groups added in said second step.

13. The process of claim 6 wherein the organic compound containing active hydrogen containing groups and having a molecular weight of at least about 1000 is a hydroxyl polyester prepared by reacting a polycarboxylic acid with a polyhydric alcohol.

14. The process of claim 6 wherein the organic compound containing active hydrogen containing groups and having a molecular weight of at least about 1000 is a polyhydric polyalkylene ether.

15. The process of claim 6 wherein the organic compound having a molecular weight less than 500 is a glycol.

16. The process of claim 6 wherein the organic compound having a molecular weight less than 500 is an organic diamine.

17. The process of claim 6 wherein the organic polyisocyanate is an aromatic diisocyanate.

18. The process of claim 17 wherein the aromatic diisocyanate is 4,4'-diphenylmethane diisocyanate.

19. The process of claim 17 wherein the aromatic diisocyanate is tolylene diisocyanate.

20. The process of claim 17 wherein the aromatic diisocyanate is dimeric tolylene diisocyanate.

References Cited in the file of this patent

UNITED STATES PATENTS

| | | |
|---|---|---|
| 2,625,531 | Seeger | Jan. 13, 1953 |
| 2,850,476 | Seeger | Sept. 2, 1958 |
| 2,870,114 | Shrimpton et al. | Jan. 20, 1959 |
| 2,871,218 | Schollenger | Jan. 27, 1959 |
| 2,871,227 | Walter | Jan. 27, 1959 |
| 2,883,359 | Muller | Apr. 21, 1959 |
| 2,888,432 | Fauser | May 26, 1959 |
| 2,905,652 | Best et al. | Sept. 22, 1959 |
| 2,912,408 | Nischk et al. | Nov. 10, 1959 |
| 2,998,403 | Muller et al. | Aug. 29, 1961 |
| 3,001,971 | Scott et al. | Sept. 26, 1961 |
| 3,014,894 | Muller et al. | Dec. 26, 1961 |